April 24, 1945. J. C. QUAYLE 2,374,498

GUIDES FOR THE TRANSMISSION OF ELECTRIC WAVES

Filed July 1, 1942

INVENTOR
Joshua Creer Quayle
by:
ATTORNEYS

Patented Apr. 24, 1945

2,374,498

UNITED STATES PATENT OFFICE 2,374,498

GUIDE FOR THE TRANSMISSION OF ELECTRIC WAVES

Joshua Creer Quayle, Helsby, England, assignor to British Insulated Cables Limited, Prescot, Lancashire, England, a company of Great Britain Application July 1, 1942, Serial No. 449,370
In Great Britain July 10, 1941

6 Claims. (Cl. 178—44)

This invention is concerned with the manufacture of guides of tubular form and rectangular cross-section for the transmission of electromagnetic waves. The object is to provide a simple construction of such a guide which has a substantial degree of flexibility to permit change of direction of the travel of the wave in gradual bends and twists.

The tubular guide is made of thin sheet metal, for instance copper, and is formed from two strips which may be similar or different, and which are joined together with sufficiently complete joints running longitudinally. One of these strips is formed into a rectangular trough with transverse grooves extending outwards from the wall of the trough to assist in giving flexibility. It is important that in forming the transverse grooves they should not be permitted to produce any inward projection forming an obstruction which would diminish locally the cross-section of the tube, since such projection would produce a partial reflection of the waves out of the desired direction and thereby interfere with the transmission. The second strip may be flat to form the fourth side of a rectangle by combination with the trough, or it may be a similar trough so that each strip provides half the height of the tube. The edges of the two strips are united, preferably continuously, but they may be effectively joined by using a number of closely spaced joins. It is preferable to flange the trough or troughs outwards, so that the joints may be made by means of the flanges, either with the outwardly extending edge of a flat strip, or with similar flanges on a second trough.

The accompanying drawing shows three examples by way of illustrating the invention.

In all these examples the rectangular cross-section of the tubular guide has one dimension considerably longer than the other. The form shown in Figure 1 consists of a flat sheet and a trough; the form shown in Figures 3 and 4 are made up from two similar troughs.

Figure 1:
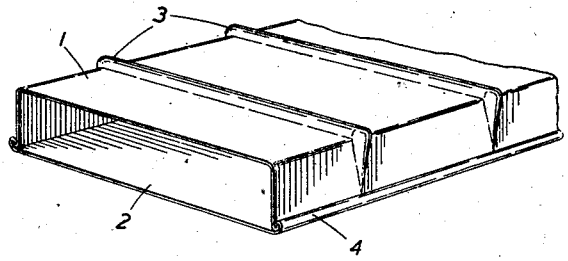
Figure 1 is a perspective view of one form.
Figure 2:
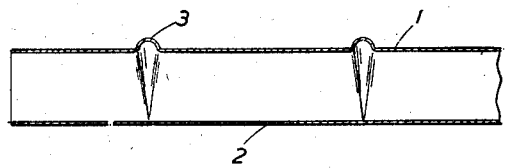
Figure 2 is a longitudinal section of the form shown in Figure 1 in a plane parallel with the narrow side walls.

In Figure 1 the rectangular trough 1 is provided with transverse hollow beads forming grooves 3 at intervals formed by pressing outward the metal of the trough into a semi-circular shape as shown in Figure 2. These grooves extend completely across the longer side of the trough and also extend down the sides of the trough, tapering off as the edge is approached. The fourth wall of the rectangle is provided by a flat strip 2 and the two members forming the tube are connected together by rolling their edges as shown at 4. It will be seen that the grooves provide flexibility of the tube in the plane of Figure 2.

Figure 3:
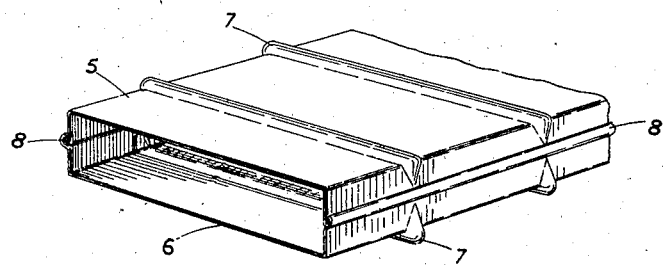
Figures 3 and 4 are perspective views of two other forms.

In the construction shown in Figure 3, two troughs 5 and 6, each similar to the trough 1 shown in Figure 1, are used. These troughs are of less depth than the trough 1 of Figure 1, so that together they make up two similar halves of a tube, each half having transverse grooves 7 similar to the grooves 3 of Figures 1 and 2. The two halves are joined together by rolling their edges as shown at 8. This also gives flexibility in the one plane.

Figure 4:
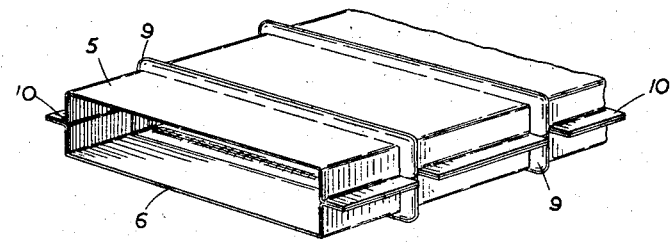

The construction shown in Figure 4 is similar in general to that of Figure 3, but the transverse grooves 9 are not tapered off at the sides as are the grooves 7, and the edges of the two troughs are not rolled together but are left as flat flanges welded or soldered together as shown at 10. These flanges are interrupted at the places where the grooves 9 occur.

The transverse grooves may conveniently be formed by a pressing or rolling operation, which may, at the same time, convert a flat strip into the required trough form. The operation is preferably done in at least two stages, the grooves being originally formed before the trough is brought down to its final rectangular shape; they may, for instance, be produced in the strip at the same time that this has its sides bent out of the plane of the bottom of the trough by an angle substantially less than 90° and then in a further operation the sides may be closed down so as to give a rectangular trough.

Tubular guides of the forms described and illustrated provide, in an all-metal construction, a combination of (a) sufficient rigidity to avoid interference with the efficient transmission of electric waves, with (b) sufficient flexibility to permit of varying the direction of run of the guide within the limits practically required. In using these guides for electric waves of the lowest frequency which can be transmitted through such rectangular tubes, it is important to maintain substantially invariable the distance between one pair of opposite sides of the rectangle. This dimension, which is the longer dimension of rectangles of uneaqual sides, is related to the wave length. This condition is met by the present guide form which is of a stiffness resisting change of dimensions of the rectangle while permitting bending of the guides by the aid of the transverse grooves in one of the two planes of the rectangle and twisting about its longitudinal axis sufficient to accommodate the usual practical requirements for running the guides. If the guides should, in the course of bending and twisting as described, be subjected to local variation of the smaller dimension of the rectangle, this does not produce serious interference with the transmission of waves, since this dimension may be varied within limits without producing undue variation in the attenuation by the guide of the transmitted waves.

What I claim as my invention is:

1. A tubular wave guide of rectangular cross-section, comprising two strips of sheet metal joined together longitudinally, one strip being in the form of a trough with outwardly projecting hollow beads forming grooves at intervals in the wall thereof.

2. A tubular wave guide of rectangular cross-section, consisting of two strips of sheet metal joined together longitudinally, one strip being in the form of a trough with outwardly projecting transverse hollow beads forming grooves at intervals in the wall thereof, the said trough forming three sides of the rectangle, and the other being a flat strip forming the fourth side.

3. A tubular wave guide of rectangular cross-section consisting of two strips of sheet metal joined together longitudinally, each strip being in the form of a trough with outwardly projecting transverse hollow beads forming grooves at intervals in the walls thereof.

4. A tubular wave guide of rectangular cross-section, comprising two strips of sheet metal joined together longitudinally, one strip being in the form of a trough with outwardly projecting transverse hollow beads forming grooves at intervals in the walls thereof, said grooves being of uniform width in the bottom of the trough and being of tapering width in the sides of the trough, diminishing to zero width as the joint is approached.

5. A tubular wave guide of rectangular cross-section, comprising two sheets of strip metal joined together longitudinally, one being in the form of a trough with outwardly projecting transverse hollow beads forming grooves at intervals in the wall thereof, the strips having outwardly projecting flanges at the joint.

6. A tubular wave guide of rectangular cross-section with one dimension larger than the other, comprising a strip of sheet metal in the form of a trough constituting one of the wide sides and at least part of each of the two narrow sides and having outwardly projecting transverse hollow beads forming grooves at intervals therein, a second strip of metal completing with the first rectangular form of the guide and joined with the first by longitudinal seams, one located at each of the narrow sides.

JOSHUA CREER QUAYLE.